(12) United States Patent
Takamoto et al.

(10) Patent No.: US 6,628,529 B2
(45) Date of Patent: Sep. 30, 2003

(54) CARTRIDGE FOR A GAME MACHINE

(75) Inventors: Junji Takamoto, Kyoto (JP); Yasuhisa Kitano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 10/224,597

(22) Filed: Aug. 21, 2002

(65) Prior Publication Data

US 2003/0040353 A1 Feb. 27, 2003

(30) Foreign Application Priority Data

Aug. 22, 2001 (JP) ........................................ 2001-252153

(51) Int. Cl.⁷ .............................. H05K 7/14; H05K 7/18
(52) U.S. Cl. ...................... 361/800; 361/818; 361/816; 361/752; 361/753; 361/737; 361/748; 361/730; 361/727; 361/728; 361/714
(58) Field of Search .................................. 361/752, 753, 361/800, 818, 816, 714, 728, 727, 737, 748, 730

(56) References Cited

U.S. PATENT DOCUMENTS 5,659,459 A * 8/1997 Wakabayashi et al. ...... 361/753
6,043,983 A * 3/2000 Taylor et al. ................ 361/704
6,252,313 B1 * 6/2001 Zhang et al. .................. 307/91
6,580,028 * 6/2003 Mellberg et al. .......... 174/35 R

* cited by examiner

Primary Examiner—David Martin
Assistant Examiner—Thanh Yen Tran
(74) Attorney, Agent, or Firm—Nixon & Vanderhye P.C.

(57) ABSTRACT

A cartridge, including a housing, a substrate, a semiconductor element (e.g., a memory), and a shielding element, is detachably mountable to a game machine having a connector and a grounding terminal, and a recess. The substrate within the housing has an external connection terminal exposed through the open end, a circuit pattern, and a ground electrode. The shielding element within the housing substantially covers at least one principal face of the substrate and electrically connected to the ground electrode. The housing has an opening in a principal face facing the ground electrode on the substrate and the shielding element, through which the shielding element is partly exposed. The shielding element has a protruding shield convex exposed through the opening. When the cartridge is mounted in the recess, the shield convex is electrically connected to the ground electrode through the opening to remove unwanted radiation of electromagnetic waves on the substrate.

7 Claims, 5 Drawing Sheets

CARTRIDGE FOR A GAME MACHINE

BACKGROUND OF THE INVENTION

1. Field of the Invention

The present invention relates to a cartridge for a game machine. In particular, the present invention relates to an improved cartridge for a game machine, such as a memory cartridge or the like to be mounted in a detachable manner to a game machine (e.g., a video game machine or a hand-held game machine), the improvement being to alleviate unwanted radiation of electromagnetic waves.

2. Description of the Background Art

A game machine such as a video game machine or a hand-held game machine may operate in conjunction with a memory cartridge such as a ROM cartridge or a RAM cartridge which is detachably mounted to the game machine. A memory cartridge or other cartridge for a game machine is likely to cause unwanted radiation (i.e., external leakage) of electromagnetic waves of 10 MHz or above, especially as increasingly higher CPU clock frequencies are used in the game machine. Such unwanted radiation may unfavorably affect surrounding electronic devices including CPUs (e.g., those used in computers, portable information terminals, and pacemakers), and therefore is a potential cause for the malfunctioning of such devices. Entities such as the FCC (Federal Communication Commission) of the U.S. provide regulations against such unwanted radiation of electromagnetic waves, while the VCCI (Voluntary Control Council For Interference By Information Technology Equipment) of Japan provides recommendations concerning the same.

In order to prevent unfavorable influences on surrounding electronic devices and to alleviate unwanted radiation, conventional cartridges for a game machine typically include a metal shield plate, such that a portion of the shield plate is electrically connected to a grounding terminal on a substrate in the cartridge. The grounding terminal serves to absorb the unwanted radiation via a grounding terminal of a connector within an associated game machine.

However, merely introducing a shield plate within the cartridge and electrically connecting it to a grounding terminal of the game machine via a grounding terminal of a connector within the game machine does not sufficiently alleviate unwanted radiation of electromagnetic waves. Moreover, the influence of unwanted radiation of electromagnetic waves increases as the CPU clock frequency used in the game machine is increased.

SUMMARY OF THE INVENTION

Therefore, an object of the present invention is to provide a novel cartridge for a game machine which can alleviate the influence of unwanted radiation of electromagnetic waves.

Another object of the present invention is to provide a cartridge for a game machine which can alleviate the influence of unwanted radiation of electromagnetic waves by utilizing a simple and inexpensive construction.

A further object of the present invention is to provide a cartridge for a game machine which addresses the problem of unwanted radiation of electromagnetic waves, and which allows for easy assembly, excellent mass producibility, and low production cost.

The present invention has the following features to attain the above object.

A first aspect of the present invention (claim 1) is directed to a cartridge for a game machine, the cartridge being detachably mountable to a game machine having a connector and a grounding terminal in connection with a recess for receiving the cartridge, the cartridge comprising: a housing, a substrate, a semiconductor element, and a shielding element. The housing includes an upper half and a lower half, and has an open end face at which to mount the cartridge to the connector in the game machine. The substrate is accommodated in the housing, and has an external connection terminal exposed through the open end face, a circuit pattern, and a ground electrode. The semiconductor element (such as a memory) is mounted on the substrate. The shielding element is accommodated within the housing, covers a substantial portion of at least one principal face of the substrate, and is electrically connected to the ground electrode. The housing has an opening in a principal face facing the ground electrode on the substrate and the shielding element to allow the shielding element to be partly exposed through the opening. The shielding element has a shield convex, the shield convex protruding and being exposed through the opening.

Thus, when the cartridge is mounted in the recess, the shield convex is electrically connected to the ground electrode through the opening, thereby removing unwanted radiation of electromagnetic waves occurring on the substrate.

In one embodiment (claim 2), the opening in the housing has a substantially band-like shape extending along a side of the housing. The shield convex is shaped so as to correspond to the substantially band-like shape of the opening.

In another embodiment (claim 3), the shielding element is formed of a plate metal of a conductive material, a portion of which is bent to integrally form the shield convex.

In still another embodiment (claim 4), the opening and the shield convex are formed near a leading end of the cartridge with respect to a direction of inserting the cartridge into the recess, such that the opening and the shield convex extend along a direction perpendicular to the insertion direction.

In still another embodiment (claim 5), the housing includes at least one positioning member on the inside of at least one of the upper and lower halves, the at least one positioning member being for positioning the substrate and the shielding element.

In still another embodiment (claim 6), the cartridge further comprises: a further shielding element being accommodated on the inside of another principal face of the housing so as to face the substrate. The shielding element and the further shielding element are electrically connected to each other within the housing.

In still another embodiment (claim 7), the open end face of the housing is dimensioned so that the housing has a width which is substantially the same as a width of the substrate and that the housing has a thickness which is greater than a thickness of the substrate. The cartridge further comprises a spacer, the spacer being accommodated within the housing to enclose the open end face where the open end face has a thickness greater than the thickness of the substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1B:
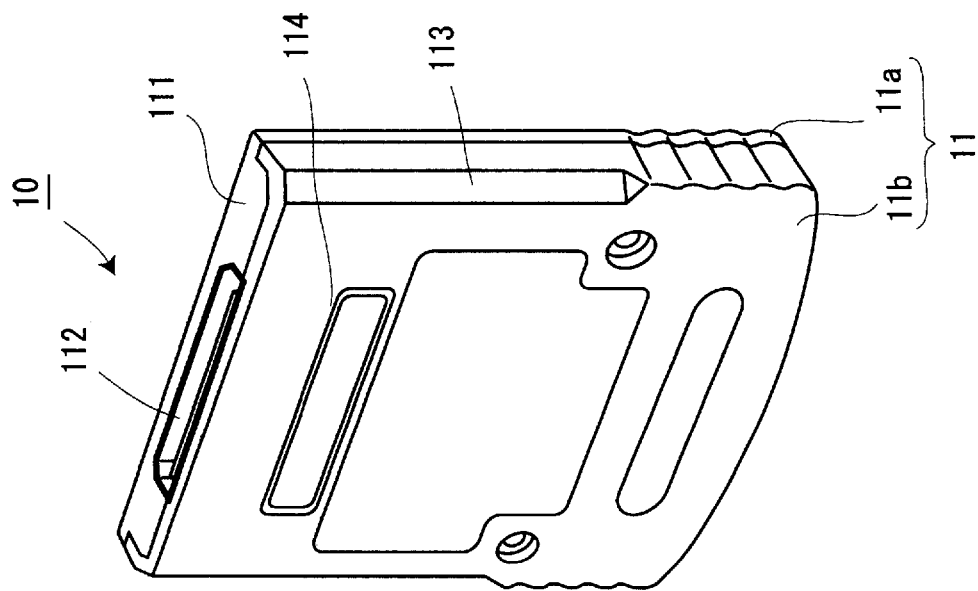
FIGS. 1A and 1B are perspective views showing a cartridge for a game machine according to one embodiment of the present invention.
Figure 1A:
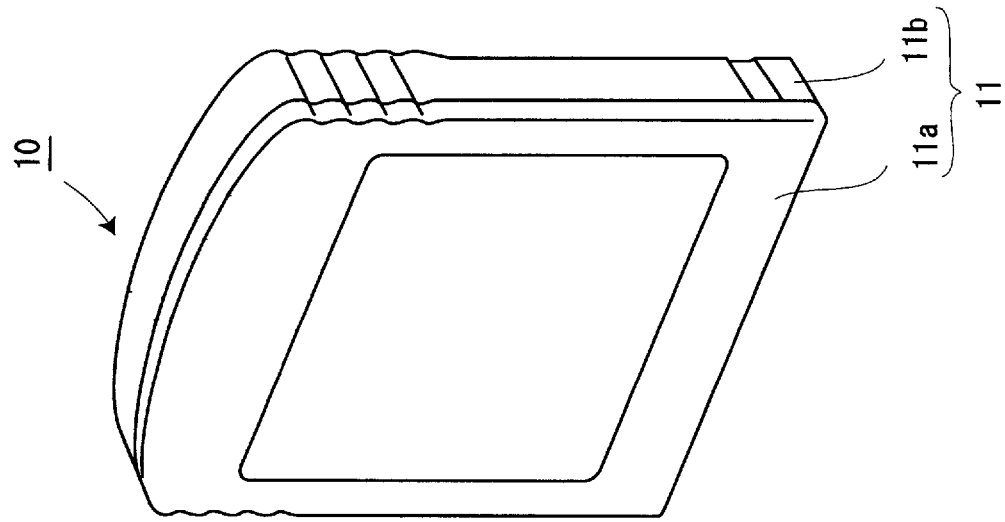
Figure 2:
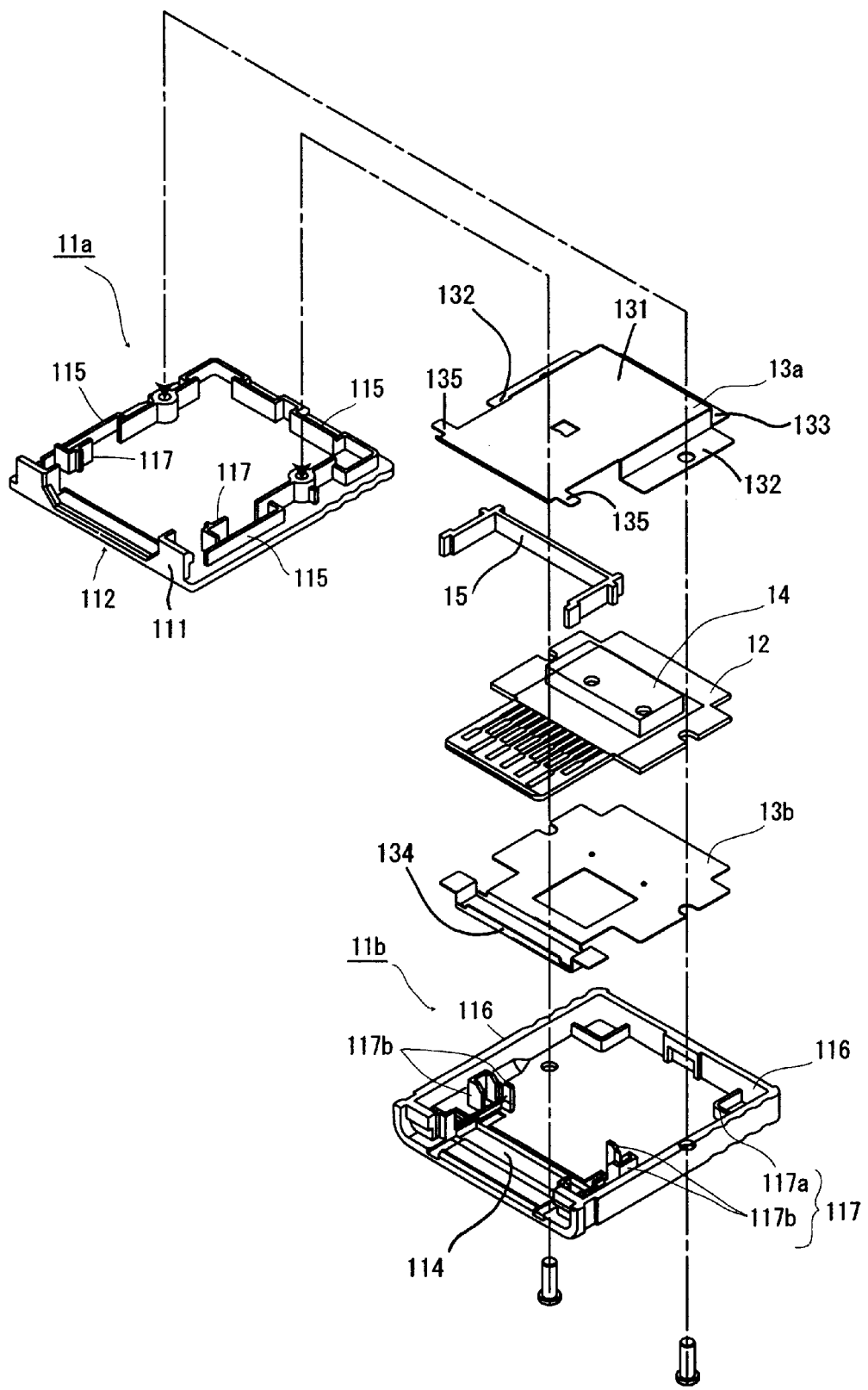
FIG. 2 is an exploded perspective view showing the cartridge.
Figure 3B:
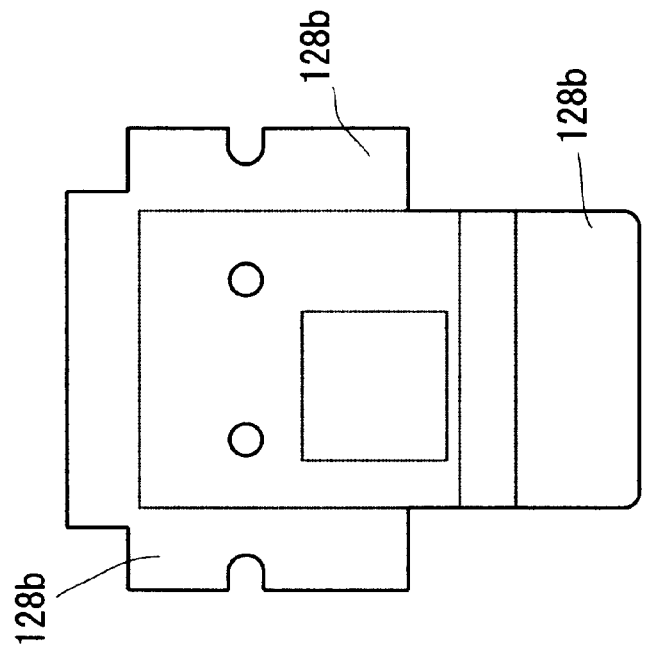
FIGS. 3A and 3B are detailed views showing a substrate accommodated within the cartridge.
Figure 3A:
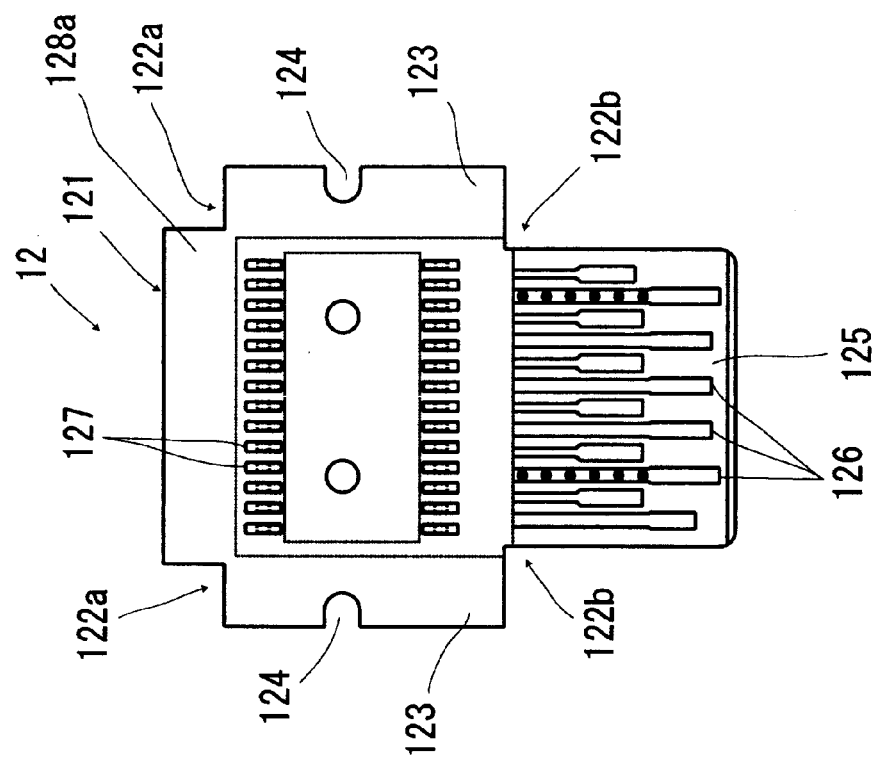

FIGS. 1A and 1B are perspective views showing a cartridge for a game machine according to one embodiment of the present invention. FIG. 2 is an exploded perspective view showing the cartridge for a game machine. FIGS. 3A and 3B are detailed views showing a substrate. With reference to FIGS. 1A, 1B, 2, 3A, and 3B, the structure of the cartridge 10 for a game machine (hereinafter simply referred to as a "cartridge") will be described. As shown in FIGS. 1A, 1B, and 2, the cartridge 10 comprises a housing 11, a substrate 12, and a shielding element 13 (shown as shielding plates 13a and 13b) accommodated within the housing 11. The housing 11 has a generally flat and rectangular planar shape, and is composed of an upper half 11a and a lower half 11b. The housing 11 has a front face shown in FIG. 1A and a rear face shown in FIG. 1B. A leading end of the housing 11, as inserted into a connector 30 (see FIG. 4) of a game machine 20 (see FIG. 4) along an insertion direction, defines an open end face 111. An opening 112 is formed in the open end face 111. On one side (or optionally on both sides) of one of the principal faces of the housing 11 is provided a tapered portion 113 which prevents insertion in the wrong orientation and provides guidance when mounting the cartridge 10. Furthermore, on one of the principal faces of the housing 11 opposite from the ground electrode on the substrate 12 and the shielding element 13 (e.g., the rear face in the embodiment as shown in FIG. 1B) is provided an opening 114 for exposing a portion of the shielding element 13.

More specifically, as shown in FIG. 3A, the substrate 12 comprises an insulative substrate 121 one of whose principle face has a rectangular planar shape (which is longer from the top to the bottom than sideways as shown). The insulative substrate 121 has small square notches 122a in the upper right and left corners and small rectangular notches 122b in the lower right and left corners formed therein, thus leaving right and left ears 123. Attachment holes 124 are formed in the right and left ears 123. A plurality of external connection terminals 126 are formed side by side on a lower portion 125 of the substrate 12. Preferably, the external connection terminals 126 are provided with terminal portions (i.e., portions having inflated widths) thereof being disposed in a zigzag manner, so that a large number of external connection terminals 126 can be accommodated on the lower portion 125 of the substrate 12 having a relatively short width. In the central portion of the substrate 12, a plurality of terminals 127 for mounting a memory (a semiconductor element) 14 of any of various kinds, such as a ROM, a RAM, or a flash memory, are provided. The plurality of terminals 127 are connected to the corresponding ones of the external connection terminals 126 via an appropriate circuit pattern (not shown). A ground electrode 128a having a substantially large area is formed in the ears 123 and the upper side of the substrate 12, so as to surround the terminals 127 and the circuit pattern. On the other principal face (rear face) of the substrate 12, as shown in FIG. 3B, a ground electrode 128b having a substantially large area is formed so as to surround a circuit pattern (not shown). The ground electrode 128b is electrically connected to the ground electrode 128a.

Referring back to FIG. 2, in the upper half 11a, a wall 115 is formed so as to extend along the open end face 111 (except for the opening 112), the right and left side, and a side opposite from the open end face 111 (i.e., the upper side as shown in FIG. 1A). Similarly, in the lower half 11b, a wall 116 is formed so as to extend along the open end face 111 (except for the opening 112), the right and left side, and a side opposite from the open end face 111 (i.e., the upper side as shown in FIG. 1A). The wall 116 provided in the lower half 11b is formed so as to lie outside of the wall 115 in the upper half 11a as seen from above. Thus, when the upper half 11a and the lower half 11b are put together, the wall 115 comes into contact with the inner side of the wall 116. A plurality of positioning members 117 are formed so as to cooperate with the wall 115 and/or wall 116. The positioning members 117 include: positioning members 117a, each of which abuts an upper corner of the substrate 12 (where each notch 122a is formed) for positioning; and positioning members 117b, each of which abuts with a lower side of the substrate 12 (next to each notch 122b) for positioning. The positioning members 117 may alternatively be formed as a single element depending on the shape and position thereof.

The shielding element 13 is accommodated within the housing 11 so as to cover a substantial portion of at least one of the principal faces of the substrate 12 (e.g., a rear face in the embodiment illustrated in FIG. 2) and is electrically coupled to the ground electrode. Specifically, the shielding element 13 preferably includes a shield plate 13a for the front face and a shield plate 13b for the rear face. Both shield plates 13a and 13b are formed of a conductive material, such as a metal. The shield plate 13a is formed so as to have a planar portion 131 (which corresponds to areas of the substrate 12 excluding the ears 123 and the upper side thereof) which is supported at a height slightly greater than the thickness of the semiconductor element, with bent portions 132 and 133 integrally connecting the planar portion 131 to the ears 123 and the upper side of the substrate 12. Positioning bumps 135 are provided at lower sides of the planar portion 131. The shield plate 13b has a planar configuration corresponding to the substrate 12, and includes a shield convex 134 in a region corresponding to the opening 114 (near the opening 112). The shield convex 134 is formed so as to be exposed through the opening 114, with a lateral expanse in a band-like shape.

A spacer 15 is provided so as to enclose any voids left in the opening 112. The spacer 15 is formed of a piece of resin material having a general "U" shape.

Next, a method of assembling the cartridge 10 will be described. First, the upper half 11a and the lower half 11b of the housing 11, the substrate 12 having the semiconductor element 14 mounted thereon, the shield plates 13a and 13b, and the spacer 15, all of which are formed in the above-described manner, are prepared. First of all, the upper half 11a is placed with the inside facing up, as shown in FIG. 2. On the upper half 11a, the shield plate 13a is positioned in place in a reversed manner, i.e., so that the surface shown in FIG. 2 is facing down at the upper half 11a. On the upper half 11a carrying the shield plate 13a thereupon, the spacer 15 and the substrate 12 are positioned in place in a reversed manner, i.e., so that the respective surfaces shown in FIG. 2 are facing down at the upper half 11a. Upon all of these, the shield plate 13b is positioned in place in a reversed manner, i.e., so that the surface shown in FIG. 2 is facing down at the upper half 11a. Upon all of these, the lower half 11b is positioned in place. Thereafter, screws 16 are tightened so that the housing 11 now accommodates therewithin the shield plate 13a, the spacer 15, the substrate 12, and the shield plate 13b so as to be interposed between the upper half 11a and the lower half 11b.

When the cartridge 10 is assembled in this manner, shield convex 134 of the shield plate 13b is exposed through the opening 114, and the external connection terminals 127 on the substrate 12 are exposed through the opening 112.

Next, a relationship between the cartridge 10 and a video game machine, as an exemplary game apparatus to which the cartridge 10 is applicable, will be described.

Figure 4:
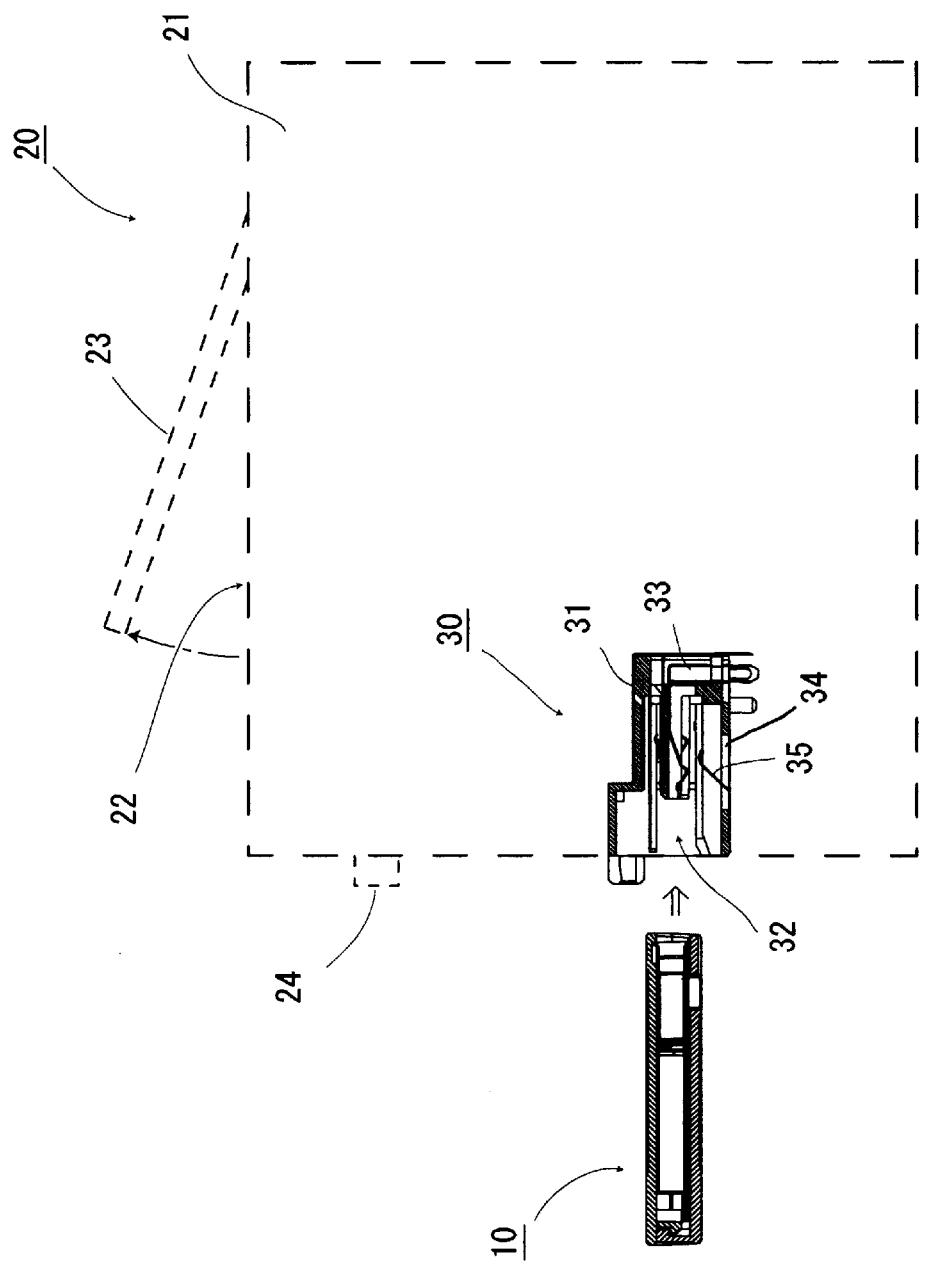
FIG. 4 is a partial cross-sectional view showing the cartridge and a video game machine to which the cartridge is mounted.
Figure 5A:
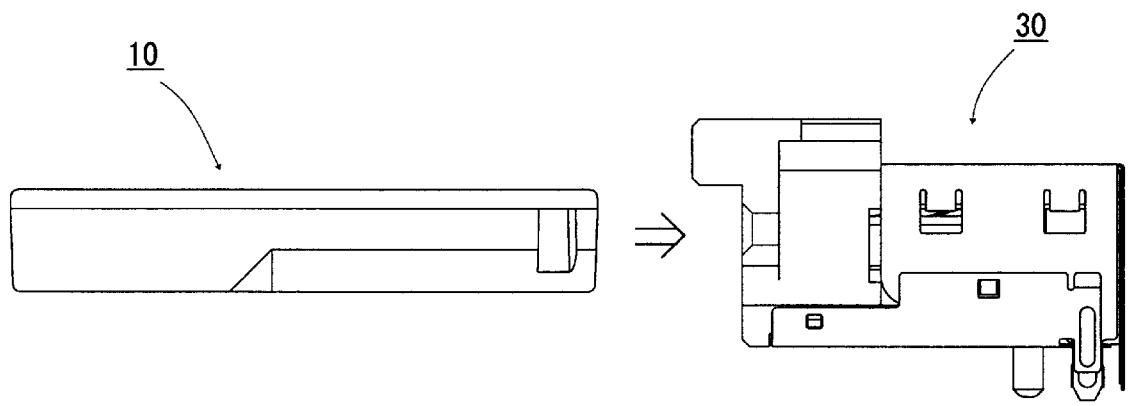
FIGS. 5A and 5B are cross-sectional views showing a connector, illustrating a relationship between the cartridge and the video game machine.
Figure 5B:
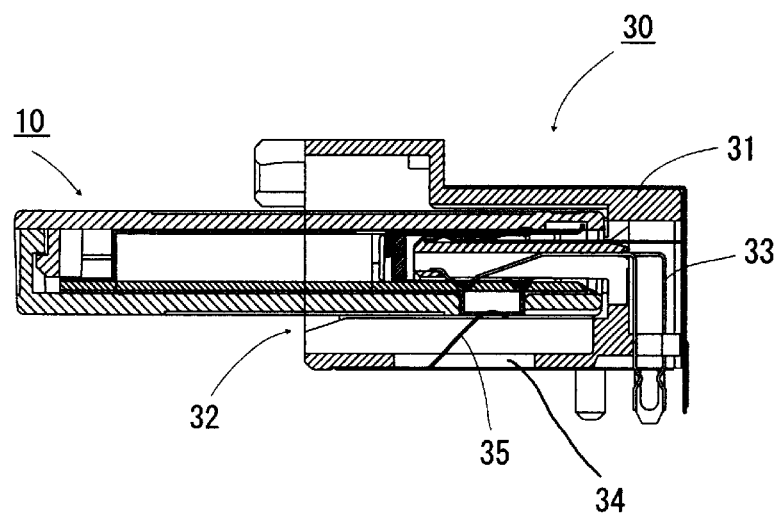

FIG. 4 is a partial cross-sectional view showing the cartridge according to the present embodiment and a video game machine to which the cartridge is mounted. FIGS. 5A and 5B are cross-sectional views showing a connector, illustrating a relationship between the cartridge and the video game machine. As shown in FIG. 4, the video game machine 20 includes a housing 21. On the housing 21, a disk mount 22 for mounting an optical disk (e.g., a DVD, a CD-ROM, or the like) is provided. A hatch 23 is attached to the disk mount 22 so as to be capable of opening and closing. On the front face or the front panel of the housing 21, a connector 24 for connecting a controller (not shown) for the game machine and a connector 30 for attaching the cartridge 10 are provided.

The connector 30 has a general outlook as shown in FIG. 5A and includes a housing 31 having a cross section as shown in FIG. 5B. The housing 31 has a recess 32 for receiving the cartridge 10. A plurality of contact terminals 33 to be electrically connected to the external connection terminals 127 of the cartridge 10 are integrally formed within the recess 32. Under the recess 32 in the housing 31 is formed an opening 34. Within the connector 30, a shield contact 35 is formed so as to oppose the shield convex 134 when the cartridge 10 is mounted. In other words, the shield contact 35 is formed, in an integral manner with the housing 31, so as to be capable of being electrically connected to the shield convex 134 via the opening 34.

Next, the effects obtained when the cartridge 10 is mounted in the video game machine 20 will be described. Prior to game playing, a player inserts the cartridge 10 in the recess 32 of the connector 30 provided on the video game machine 20. As the external connection terminals 127 of the cartridge 10 are connected to the corresponding contact terminals 33 of the connector 30, power is supplied from the video game machine 20 to the cartridge 10. At this time, a CPU (not shown) in the video game machine 20 accesses the semiconductor element (e.g., a memory) 14 within the cartridge 10 to read the data stored therein or to write backup data representing a game progress to the memory 14, for example. When the CPU accesses an external memory or the like, the access is made while providing a high-frequency clock for synchronization. However, if the clock frequency has a high frequency of 10 MHz or above, unwanted radiation of electromagnetic waves (EMI: electromagnetic interference) may occur. In this case, unwanted radiation (or EMI noise) from the substrate 12 in the cartridge 10 is electromagnetic shielded by the shield plates 13a and 13b, and removed by being grounded via the shield convex 134 and the shield contact 35 to a grounding terminal (not shown) within the video game machine 20. As a result, unwanted radiation from the cartridge 10, which is partially exposed outside the recess 32 of the connector 30 (and hence the video game machine 10), can be prevented, and thus electronic devices located near the video game machine 20 can be protected from the unfavorable effects of such radiation.

Although the above embodiment illustrates a RAM cartridge as an exemplary cartridge for a game machine, it will be appreciated that the principle of the present invention is also applicable to a cartridge having any other memory or semiconductor element therein. Although the above embodiment illustrates a video game machine as an exemplary game apparatus, the present invention is also applicable to any other game machine such as a hand-held game machine.

Thus, according to the present invention, there is provided a novel cartridge for a game machine which can alleviate the influence of unwanted radiation of electromagnetic waves.

There is also provided a cartridge for a game machine which can alleviate the influence of unwanted radiation of electromagnetic waves by utilizing a simple and inexpensive construction.

There is also provided a cartridge for a game machine which addresses the problem of unwanted radiation of electromagnetic waves, and which allows for easy assembly, excellent mass producibility, and low production cost.

While the invention has been described in detail, the foregoing description is in all aspects illustrative and not restrictive. It is understood that numerous other modifications and variations can be devised without departing from the scope of the invention.

What is claimed is:

1. A cartridge for a game machine, the cartridge being detachably mountable to a game machine having a connector and a grounding terminal in connection with a recess for receiving the cartridge, the cartridge comprising:

a housing including an upper half and a lower half, the housing having an open end face at which to mount the cartridge to the connector in the game machine;

a substrate accommodated in the housing, the substrate having an external connection terminal exposed through the open end face, a circuit pattern, and a ground electrode;

a semiconductor element mounted on the substrate; and a shielding element accommodated within the housing, the shielding element covering a substantial portion of at least one principal face of the substrate and being electrically connected to the ground electrode, wherein the housing has an opening in a principal face facing the ground electrode on the substrate and the shielding element to allow the shielding element to be partly exposed through the opening, the shielding element has a shield convex, the shield convex protruding and being exposed through the opening, and when the cartridge is mounted in the recess, the shield convex is electrically connected to the ground electrode through the opening, thereby removing unwanted radiation of electromagnetic waves occurring on the substrate.

2. The cartridge according to claim 1, wherein the opening in the housing has a substantially band-like shape extending along a side of the housing, and the shield convex is shaped so as to correspond to the substantially band-like shape of the opening.

3. The cartridge according to claim 1, wherein the shielding element is formed of a plate metal of a conductive material, a portion of which is bent to integrally form the shield convex.

4. The cartridge according to claim 1, wherein the opening and the shield convex are formed near a leading end of the cartridge with respect to a direction of inserting the cartridge into the recess, such that the opening and the shield convex extend along a direction perpendicular to the insertion direction.

5. The cartridge according to claim 1, wherein the housing includes at least one positioning member on the inside of at least one of the upper and lower halves, the at least one positioning member being for positioning the substrate and the shielding element.

6. The cartridge according to claim 1, wherein the cartridge further comprises:

a further shielding element being accommodated on the inside of another principal face of the housing so as to face the substrate, wherein the shielding element and the further shielding element are electrically connected to each other within the housing.

7. The cartridge according to claim 1, wherein the open end face of the housing is dimensioned so that the housing has a width which is substantially the same as a width of the substrate and that the housing has a thickness which is greater than a thickness of the substrate, and the cartridge further comprises a spacer, the spacer being accommodated within the housing to enclose the open end face where the open end face has a thickness greater than the thickness of the substrate.

* * * * *